US009056665B2

(12) United States Patent
Veerabadran

(10) Patent No.: US 9,056,665 B2
(45) Date of Patent: Jun. 16, 2015

(54) AIRCRAFT DOOR INSTALLATION

(71) Applicant: AIRBUS OPERATIONS (SAS), Toulouse (FR)

(72) Inventor: Karounen Veerabadran, Toulouse (FR)

(73) Assignee: Airbus Operations (S.A.S.), Toulouse (FR)

( * ) Notice: Subject to any disclaimer, the term of this patent is extended or adjusted under 35 U.S.C. 154(b) by 156 days.

(21) Appl. No.: 13/801,684

(22) Filed: Mar. 13, 2013

(65) Prior Publication Data

US 2013/0264424 A1 Oct. 10, 2013

(30) Foreign Application Priority Data

Mar. 27, 2012 (EP) .................................... 12161567

(51) Int. Cl.
*B64C 1/14* (2006.01)
*B64C 25/16* (2006.01)
*E05B 77/00* (2014.01)

(52) U.S. Cl.
CPC ............... *B64C 1/1407* (2013.01); *B64C 25/16* (2013.01); *E05B 77/00* (2013.01)

(58) Field of Classification Search
USPC ........ 244/129.5, 129.4, 137.1, 102 R, 102 A; 16/82–86 C
See application file for complete search history.

(56) References Cited

U.S. PATENT DOCUMENTS

| 4,176,812 | A | | 12/1979 | Baker | |
|---|---|---|---|---|---|
| 5,803,404 | A | | 9/1998 | Petrou | |
| 5,979,825 | A | * | 11/1999 | Cox et al. .................. | 244/110 G |
| 7,178,759 | B2 | * | 2/2007 | Rouyre ...................... | 244/129.5 |
| 7,357,354 | B2 | * | 4/2008 | Mortland .................. | 244/129.5 |
| 2005/0194496 | A1 | * | 9/2005 | White ........................ | 244/129.4 |
| 2008/0128555 | A1 | * | 6/2008 | Dotte ............................ | 244/131 |
| 2010/0109497 | A1 | | 5/2010 | Blersch | |
| 2010/0127124 | A1 | | 5/2010 | Yada et al. | |
| 2010/0140394 | A1 | * | 6/2010 | Brookfield ............... | 244/102 R |
| 2010/0140395 | A1 | | 6/2010 | Amberg | |
| 2011/0127376 | A1 | | 6/2011 | Gleyse | |
| 2013/0256458 | A1 | * | 10/2013 | Kress et al. ................ | 244/129.5 |

FOREIGN PATENT DOCUMENTS

| DE | 10 2010 006816 | 8/2011 |
|---|---|---|
| FR | 2957052 | 9/2011 |

OTHER PUBLICATIONS

European Search Report for Application No. EP 12 16 1567 dated Jan. 8, 2013. European Search Report for Application No. EP 13 16 3772 dated Jul. 19, 2013.

* cited by examiner

*Primary Examiner* — Rob Swiatek
*Assistant Examiner* — Magdalena Topolski
(74) *Attorney, Agent, or Firm* — Jenkins, Wilson, Taylor & Hunt, P.A.

(57) ABSTRACT

An aircraft exterior door installation with a door attached to an airframe. A damper is arranged to damp motion of the door as it is opened by rotating it away from the airframe. A coupling mechanism couples the damper with the door over an opening damping range and decouples the damper from the door at the end of the opening damping range. The damper does not damp the motion of the door as it opens beyond the opening damping range. Instead of damping the door over its full range of motion, it is only damped over a limited inner range of its motion. A further advantage of decoupling the door and the damper is that the damper does not need to extend into the airflow to the same extent as the door, thus minimizing aerodynamic drag.

12 Claims, 11 Drawing Sheets

AIRCRAFT DOOR INSTALLATION

CROSS-REFERENCE TO RELATED APPLICATION

This application claims priority to European Patent Application No. 12 161 567.8 filed on Mar. 15, 2012, the entire content of which is incorporated by reference herein.

FIELD OF THE INVENTION

The present invention relates to an aircraft exterior door installation comprising a door pivotally attached to an airframe, and a method of operating such an installation to damp the motion of the door. Preferably, although not exclusively, the installation is a landing gear door installation. The invention also relates to a damping mechanism suitable for use in such an installation.

BACKGROUND OF THE INVENTION

A known landing gear door installation is described in US 2011/0127376 A1. The landing gear compartment is closed by several doors: front doors which open during the descent of the gear, in particular to allow the leg thereof to pass, and close after the exit of the gear so as to preserve the aerodynamic shape of the fuselage of the aircraft; and rear doors which open during the descent of the gear and remain open as long as the gear is down.

As described in FR 2957052 A1, such an arrangement can cause undesirable vibrations in the rear doors. FR 2957052 A1 provides a solution to this problem in the form of fins upstream of the doors which generate vortices in the airflow.

SUMMARY OF THE INVENTION

A first aspect of the invention provides a method of operating an exterior door mounted to an airframe of an aircraft, the method comprising:
 a) opening the door during flight of the aircraft into the airflow outside the aircraft by rotating it away from the airframe from a closed angle to an open angle;
 b) damping the motion of the door with a damper as it rotates away from the airframe over an opening damping range;
 c) decoupling the damper from the door when it reaches the end of the opening damping range so that the damper stops damping the motion of the door; and
 d) continuing to rotate the door away from the airframe over a non-damped opening range to the open angle, wherein the damper does not damp the motion of the door as it rotates over the non-damped opening range.

A second aspect of the invention provides an aircraft exterior door installation comprising a door pivotally attached to an airframe, a damper which is arranged to damp the motion of the door as it is opened by rotating it away from the airframe; and a coupling mechanism which is arranged to couple the damper with the door over an opening damping range and decouple the damper from the door at the end of the opening damping range so that the damper does not damp the motion of the door as it opens further beyond the opening damping range.

It has been found that the vibration described in FR 2957052 A1 is only significant over a limited range of motion of the door. Therefore instead of damping the door over its full range of motion, it is only damped over a limited inner range. This enables the damping mechanism to be compact and light whilst also permitting the door to open over a large angular range (which may be over 120° or as much as 145°) without being impeded by the damper. A further advantage of decoupling the door and the damper is that the damper does not need to extend into the airflow to the same extent as the door, thus minimising aerodynamic drag.

The door may comprise any exterior door of an aircraft, such as a cargo bay door. However most preferably the door is a landing gear bay door. Thus in a further preferred aspect of the invention there is provided an aircraft comprising an airframe; a landing gear mounted to the airframe in a landing gear bay; and a door installation according to the second aspect of the invention arranged to close the landing gear bay. The door is typically one of two doors, each having a damping mechanism as described below. Optionally the doors are rear doors which open and close as the landing gear moves up down and up respectively. Preferably a pair of forward doors are also provided in front of the rear doors which are opened initially to allow the landing gear to lower and then closed when the landing gear has been lowered.

Decoupling of the damper may be caused by an active retraction of the damper from the door independently of the motion of the door, but more preferably the decoupling is caused by motion of the door.

During closure of the door the damper may remain decoupled from the door at all angular ranges until the door is closed, but more preferably the method further comprises: closing the door from the open angle by rotating it towards the airframe over a non-damped closing range, wherein the damper does not damp the motion of the door as it rotates over the non-damped closing range; coupling the damper with the door at the end of the non-damped closing range so that the damper starts damping the motion of the door; and continuing to close the door by rotating it towards the airframe over a damped closing range, wherein the damper damps the motion of the door as it rotates over the damped closing range.

The opening and closing damping ranges may have the same or different start and stop angles. Equivalently, the angular sizes of the opening and closing non-damping ranges may be the same, or they may be different.

Preferably the opening and/or closing damping range extends over an angular range which is less than 50° and most preferably it is less than 40°. Typically the opening and/or closing damping range extends over an angular range which is less than 50% or 30% of the total opening range of the door (that is, the range between the door being fully closed and fully open). In a preferred embodiment the opening and closing damping ranges both extend over an angular range of about 30°, which is about 20% of the total opening range of the door.

Preferably the end of the opening damping range and/or the start of the closing damping range is less than 50° (measured from the fully closed angle) and most preferably it is less than 40°. In a preferred embodiment the opening and closing damping ranges end and start respectively at about 32° from the fully closed angle.

The damper may remain coupled with the door as it closes all the way up to its fully closed angle, but more preferably the method further comprises: decoupling the damper from the door at the end of the damped closing range so that the damper stops damping the motion of the door; and continuing to close the door to its closed angle by rotating it towards the airframe over a final non-damped closing range, wherein the damper does not damp the motion of the door as it rotates over the final non-damped closing range.

In the case where the damper remains coupled with the door up to its fully closed angle, then the opening damping range will typically also start at the fully closed angle of the door. However more preferably the method further comprises: opening the door from its closed angle by rotating it away from the airframe over an initial non-damped opening range up to the start of the damped opening range, wherein the damper does not damp the motion of the door as it rotates over the initial non-damped opening range; and coupling the damper with the door at the start of the damped opening range so that the damper starts damping the motion of the door.

Preferably the initial non-damped opening range and/or the final non-damped closing range extend over an angular range which is less than 5° and most preferably it is less than 3°. In a preferred embodiment the initial non-damped opening range and the final non-damped closing damping range both extend over a range of about 2°.

Typically the door comprises a panel with an outer face on an exterior of the aircraft and an inner face. The damper may directly engage the inner face of the panel, but more preferably the inner face of the panel carries a fitting which extends from the inner face into the airframe when the door is at its closed angle, and the damper and the door are decoupled by disengaging the fitting and a coupling member.

Typically the damper has a first end pivotally attached to a coupling member and a second end pivotally attached to the airframe. The coupling member is pivotally attached to the airframe, and the door applies a force to the coupling member (either directly or via a fitting carried by the inner face of the door panel) which causes the coupling member to rotate on its pivot, rotation of the coupling member causing the damper to change in length and damp the motion of the door.

Typically the motion of the door during damping causes the damper to move (for instance by rotating) from a first position to a second position. The damper may remain in its second position after it has decoupled with the door. However more preferably the method further comprises returning the damper back to its first position after the door and the damper have been decoupled. By returning the damper in this way as the door opens, the aerodynamic drag of the decoupled damper is minimised. Returning the damper in this way as the door closes resets the damper for the next cycle of opening and closing of the door.

The return mechanism for returning the damper back to its first position may comprise a hydraulic actuator or other actively driven device, but more preferably the return mechanism comprises a spring having a first end attached to the coupling member and a second end attached to the airframe. Optionally the return mechanism may further comprise a second spring having a first end attached to the coupling member and a second end attached to the airframe, the first spring returning the coupling member at the end of the opening damping range and the second spring returning the coupling member at the end of the closing damping range.

Preferably the damper is a linear damper which changes its length as it damps the motion of the door, although other types of dampers (such as rotary dampers) may also be used.

Preferably the damper is a hydraulic damper or dashpot which creates a damping effect by the viscous effect of forcing hydraulic fluid through a constriction. However other forms of damper may be used, for instance using eddy currents to create a force proportional to velocity.

A third aspect of the invention provides a damping mechanism comprising: a damper; and a coupling mechanism comprising: a coupling member which is pivotally attached to the damper and has a pivot bearing for pivotally connecting the coupling member to a structure when in use; and a fitting which can be engaged with the coupling member to couple the fitting with the damper and disengaged with the coupling member to decouple the fitting from the damper.

The third aspect of the invention provides a mechanism which is suitable for use in the first and second aspects of the invention. The damper and coupling mechanism can be provided as a unit which can be fitted to an aircraft or other structure.

The pivot bearing may comprise a hole, a pivot pin, or any other means for pivotally connecting the coupling member to an aircraft or other structure.

Typically a return mechanism is arranged to rotate the coupling member about the pivotal connector. Preferably the return mechanism comprises a spring having a first end attached to the coupling member. Optionally the return mechanism may comprise a pair of springs which are positioned to rotate the coupling member about the pivotal connector in opposite directions.

Typically the fitting comprises an elongate member with a curved (for instant spherical) tip which can interact with the coupling member via a rolling interaction.

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
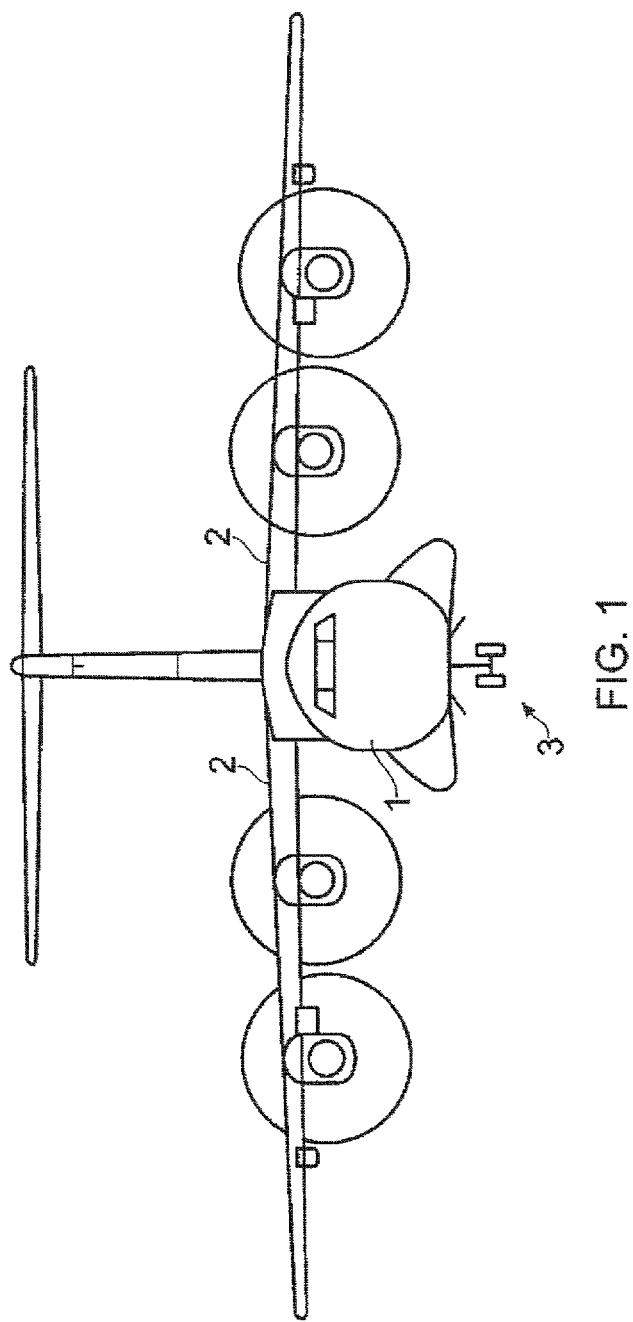
FIG. 1 is a front view of an aircraft with its nose landing gear lowered.

An aircraft shown in FIG. 1 has an airframe comprising a fuselage 1 and a pair of wings 2. The fuselage 1 has a nose landing gear 3 shown in FIG. 1 in its lowered position.

Figure 2:
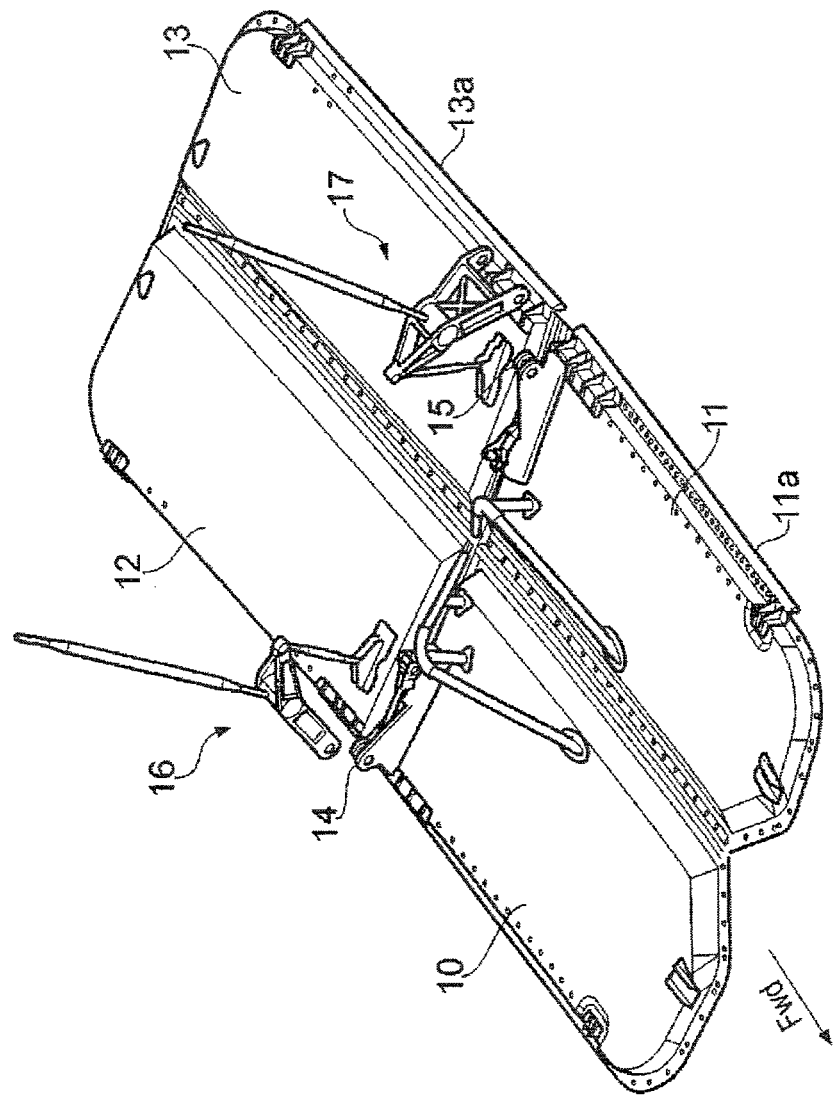
FIG. 2 is a perspective view of the nose landing gear bay doors.

During cruise of the aircraft the landing gear is housed in a landing gear bay which is closed by four landing gear bay doors 10-13 shown in FIG. 2, each of which is pivotally attached to the fuselage by a hinge 11a,13a at its outer edge so it can be rotated down from its closed position shown in FIG. 2 to its open position.

Prior to lowering the landing gear 3 the pair of forward doors 10,11 are opened to about 120° by hydraulic actuators (not shown) attached to fittings 14,15. The landing gear is then lowered, and as it does so the motion of the landing gear causes the rear doors 12,13 to open at the same time via a kinematic linkage mechanism 16,17 attached to each rear door. The forward doors 10,11 are then closed. This sequence is then reversed when the landing gear is raised after takeoff. The rear doors 12,13 are opened to a large angle of about 145° to give high ground clearance, enabling the aircraft to land on an unprepared runway without risking damage to the doors.

When the two forward doors 10,11 are open and the rear doors 12,14 are closed or partially closed, there is an aerodynamic transit excitation due to cavity flow within the landing gear bay. This excitation results in pressure oscillations inside the landing gear bay. The excitation frequency bandwidth of this phenomenon is such that there is coupling with the natural frequency of the rear doors 12,13 as they start to open, leading to vibration of the doors 12, 14 but this vibration only exists up to about 30°.

Figure 3:
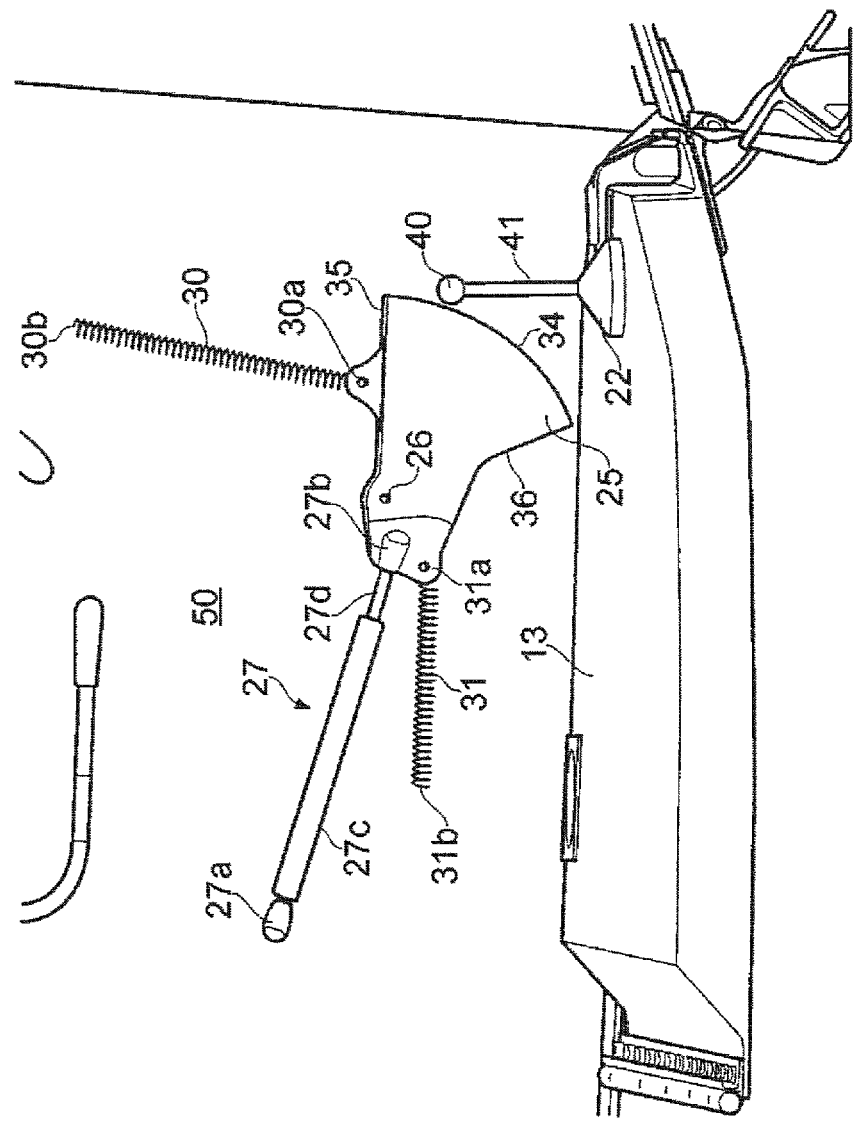
FIG. 3 shows the port rear door in its fully closed position.

To reduce such vibrations a pair of damping mechanisms are arranged to damp the motion of the rear doors as they are opened and closed. FIG. 3 show the damping mechanism for the port rear door, the other damping mechanism being a mirror image.

The door 13 comprises a panel with an outer face on an exterior of the aircraft and an inner face carrying a fitting with a base 22 and elongate shaft 41. The fitting is positioned towards the rear edge of the door and extends perpendicular to the door panel into the landing gear bay 50 as shown in FIG. 3. A roller 25 is pivotally attached to the rear wall of the landing gear bay. The roller 25 has a pivot bearing in the form of a hole 26 which receives a pivot pin (not shown) extending from the rear wall of the landing gear bay. A damper 27 has a cylinder 27c containing hydraulic fluid which is pivotally attached to the rear wall of the landing gear bay at a pivot 27a. A piston 27d is received in the cylinder and has a piston head (not shown) with one or more orifices through which the hydraulic fluid flows as the piston moves in and out of the cylinder, creating a viscous damping force proportional to velocity. The piston 27d is pivotally attached to the roller at a second pivot 27b. A pair of coil springs 30, 31 are provided, each having a first end 30a, 31a attached to the roller and a second end 30b, 31b attached to the rear wall of the landing gear bay. The springs are both in tension and bias the roller towards a central position shown in FIG. 3.

Figure 4:
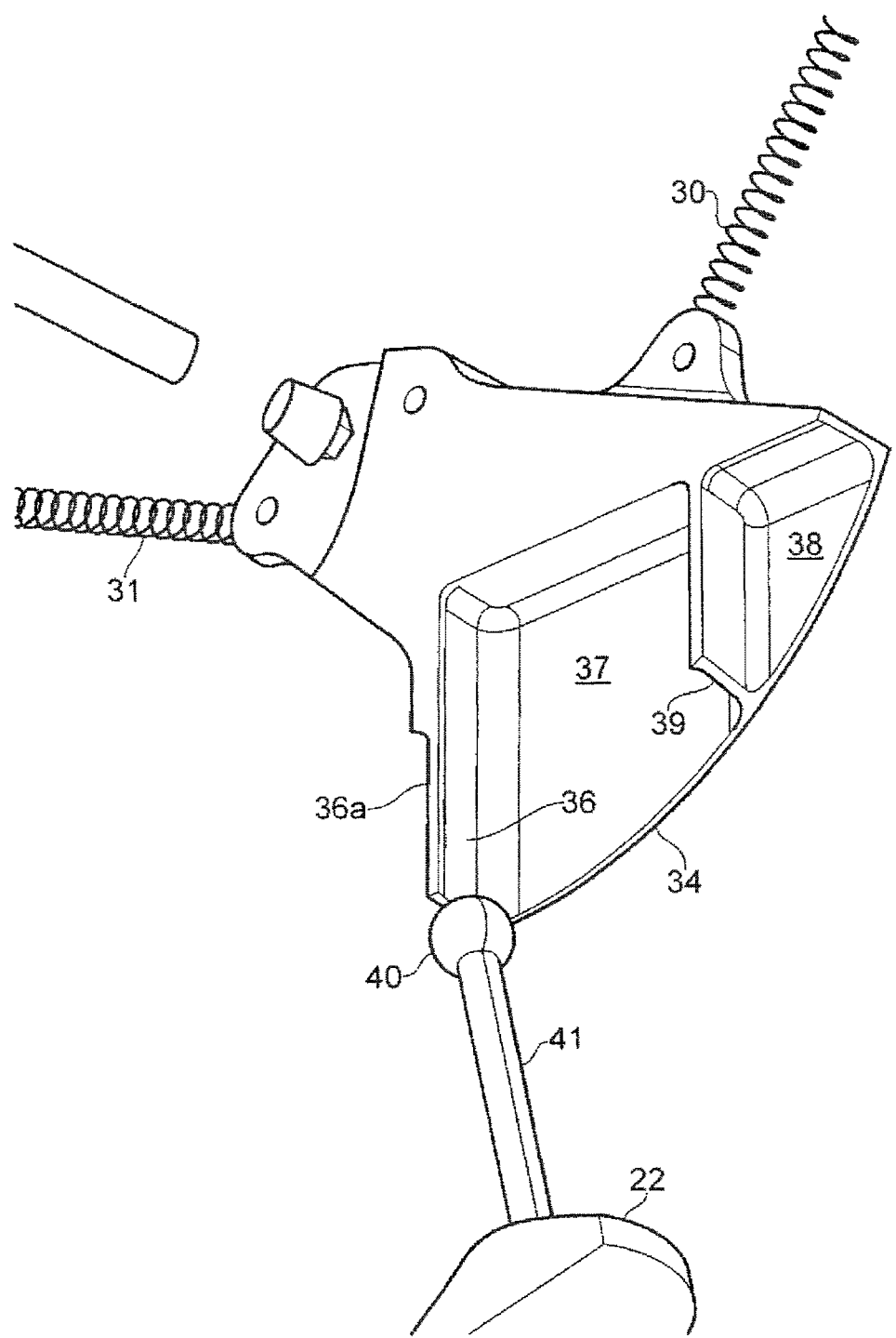
FIG. 4 is a cross-sectional view of the damping mechanism.
Figure 5:
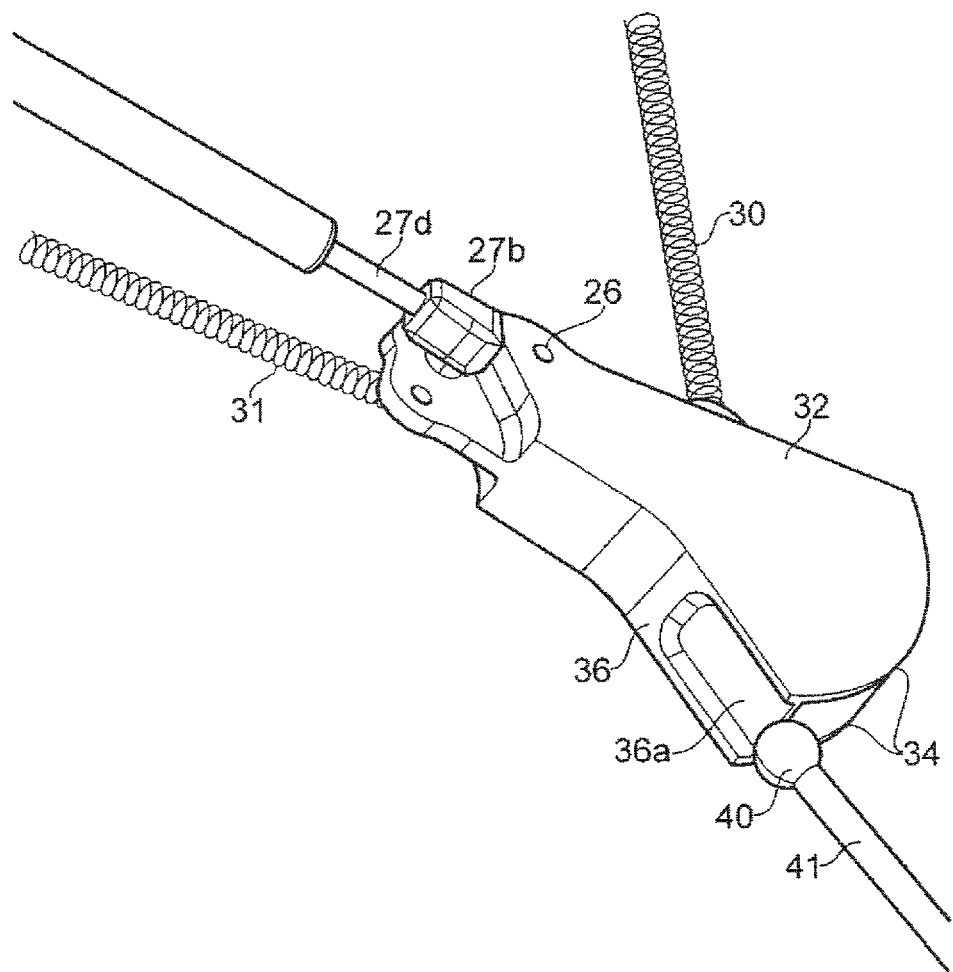
FIG. 5 shows the damping mechanism viewed from a first angle.
Figure 6:
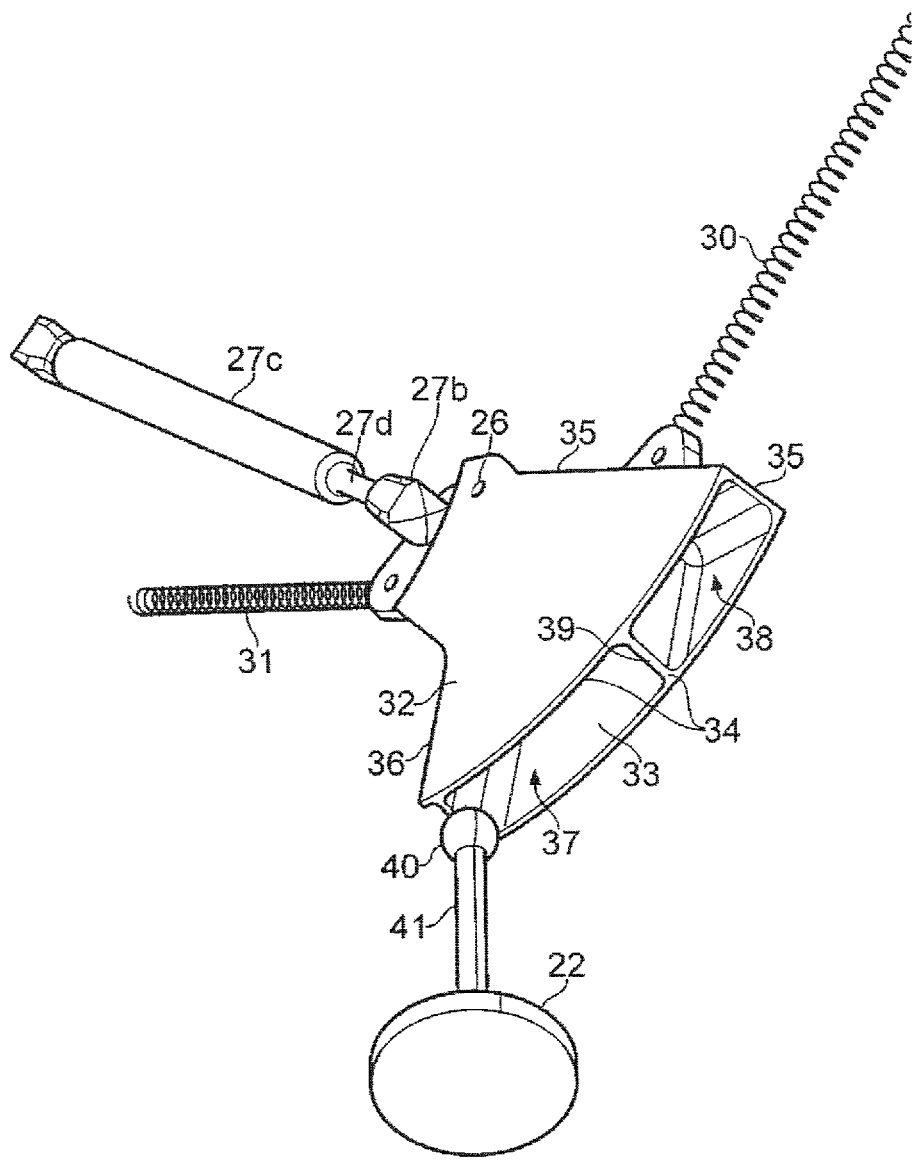
FIG. 6 shows the damping mechanism viewed from a second angle.

As shown in FIGS. 4-6 the roller 25 has a pair of parallel planar fore and aft faces 32, 33 which taper outwardly from the pivot 26 to a convex curved edge 34, an upper edge 35 and a lower edge 36. A pair of recesses 37, 38 are formed in the curved edge 34, leaving a rib 39 between the recesses which lies parallel to the lower edge 36 as shown most clearly in the cross-sectional view of FIG. 4. A recess 36a is also formed in the lower edge 36 as shown most clearly in FIG. 5.

The fitting 22 and roller 25 act together as a coupling mechanism which couples the damper 27 with the door over various preselected ranges of its motion and decouples them over others as shown in FIGS. 7 to 11.

Figure 7:
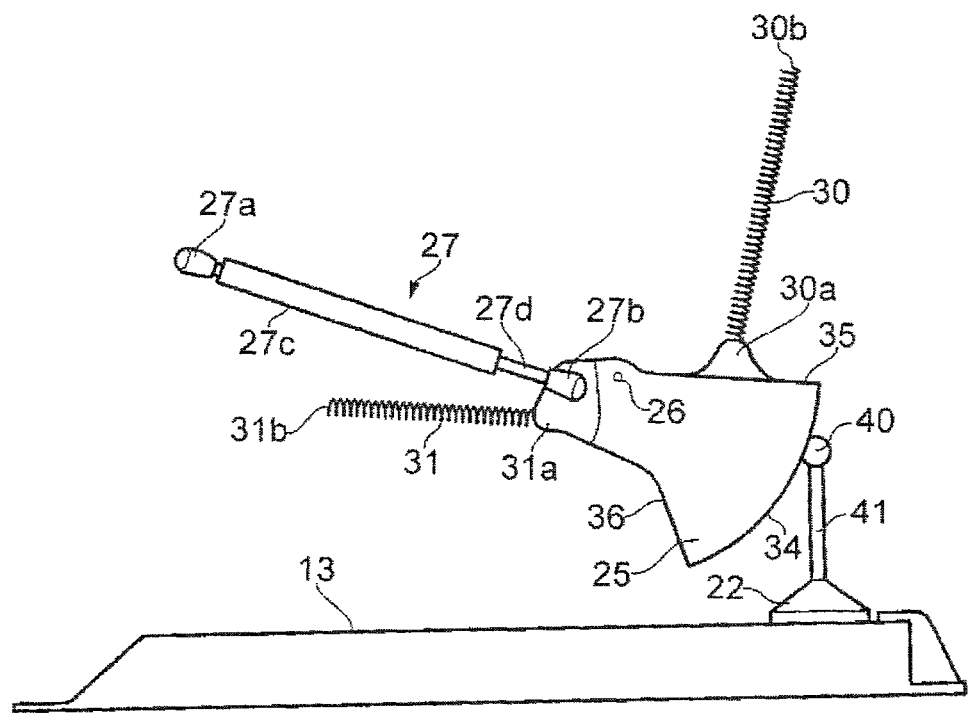
FIGS. 7-11 are front views showing the door at various stages during opening and closing.
Figure 8:
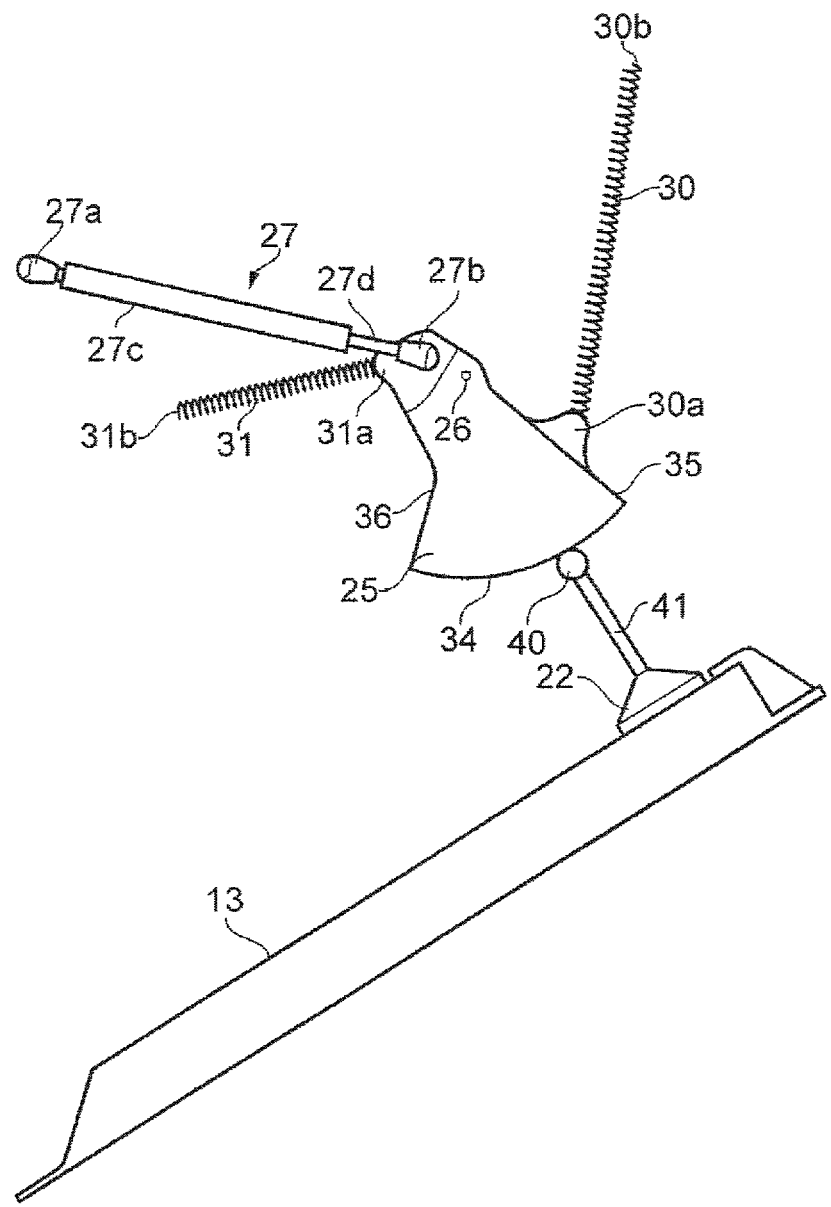
Figure 9:
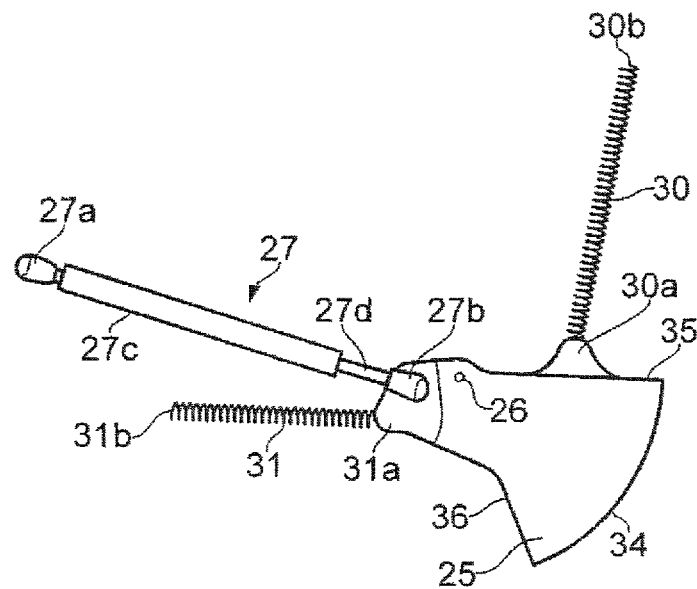
Figure 9:
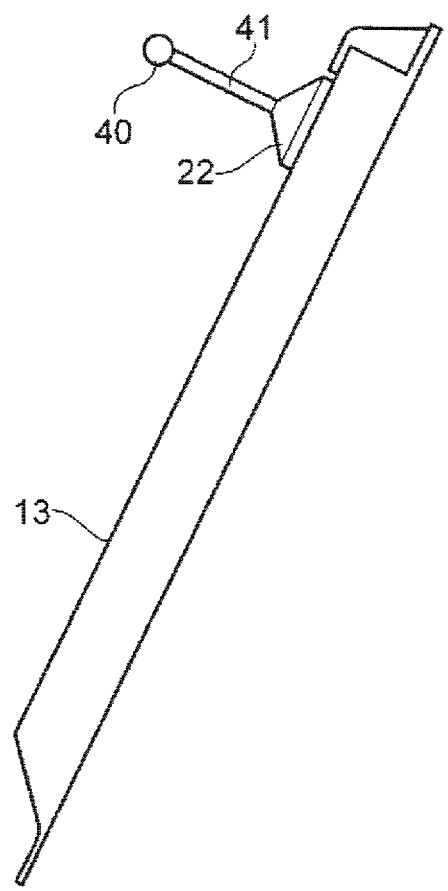

FIG. 2 shows the door in its closed position. In this closed position a spherical ball 40 at the distal end of the fitting is slightly spaced apart from the roller so that as the door is opened from its closed angle over an initial opening range of 0-2° the damper 27 is decoupled from the door and does not damp the door. When the door reaches an angle of 2° as shown in FIG. 7 the ball 40 engages the rib 39 so that the damper 27 starts damping the motion of the door. As the door continues to open over a damped opening range of 2°-32° the ball 40 pushes the rib 39 via a rolling interaction which causes the roller to rotate down relative to the airframe on its pivot bearing 26. As it does so, the piston moves first into the cylinder and then out of the cylinder, damping the motion of the door. When the door reaches an angle of 32° as shown in FIG. 8 the ball 40 clears the tip of the rib 39 and then disengages. As the ball 40 disengages from the rib 39 the extended upper spring 30 immediately pulls the roller back up to its central position. In this retracted central position no part of the roller 25 or damper 27 lies outside the landing gear bay, so aerodynamic drag is minimised. The door then continues to open over a non-damped opening range of 32°-145° during which time the retracted damper does not damp the motion of the door. FIG. 9 shows the door opened to an angle of about 75°.

Figure 10:
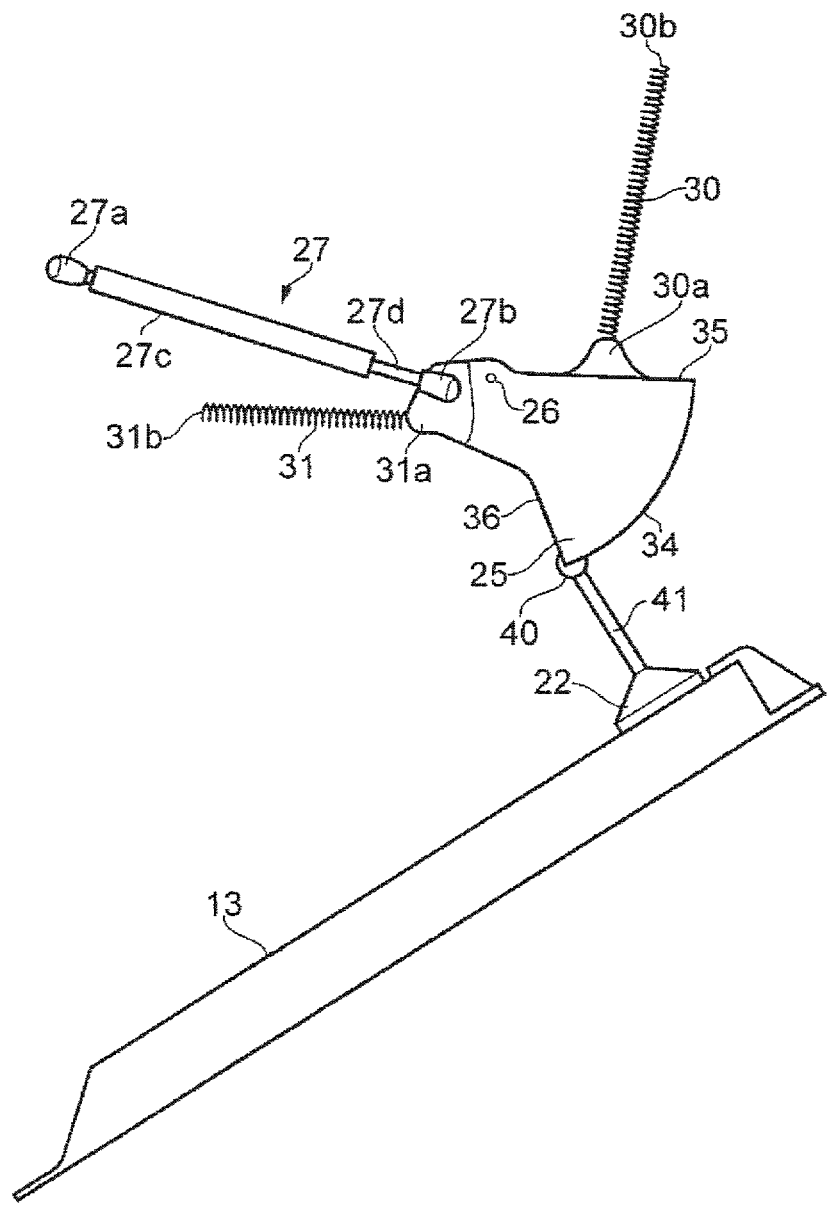
Figure 11:
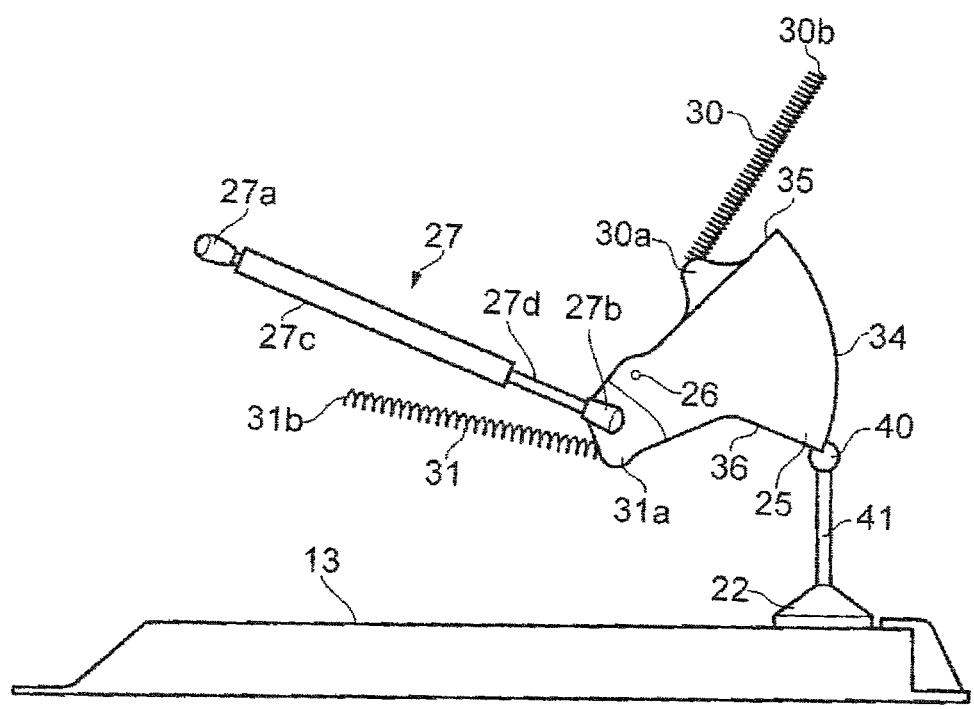

As the door is closed over a closing range of 145°-32° the damper remains decoupled and does not damp the motion of the door. When the door reaches an angle of 32° the ball 40 engages the recess 36a in the lower edge 36 of the roller as shown in FIG. 10 so that the damper starts damping the motion of the door. As the door continues to close over a damped closing range of 32°-2° the fitting pushes the edge 36 via a rolling interaction which causes the roller to rotate up. As it does so, the piston of the damper moves out of the cylinder, damping the motion of the door. When the door reaches an angle of 2° as shown in FIG. 11 the ball 40 clears the tip of the edge 36 and then disengages. As the ball 40 disengages from the edge 36 of the roller the extended lower spring 31 immediately pulls the roller back down to its central position, resetting the damping mechanism for the next opening and closing cycle. The door then continues to close to its fully closed position over a final non-damped closing range of 2°-0° during which the damper does not damp the motion of the door.

The roller and fitting act together as a coupling mechanism which only couples the damper to the door during about the inner 20% of the range of motion of the door. This arrangement is preferred in comparison to a linear damper which is directly attached to the door, since such a damper would need to have a very long stroke; would need to be very long (or attached to a very long door fitting) to avoid clashing with the structure of the airframe; and would be in the airflow outside the fuselage profile at all times that the door is open, leading to aerodynamic drag.

Although the invention has been described above with reference to one or more preferred embodiments, it will be appreciated that various changes or modifications may be made without departing from the scope of the invention as defined in the appended claims.

The invention claimed is:

1. An aircraft exterior door installation comprising a door pivotally attached to an airframe, the aircraft exterior door installation comprising:
   a damper which is arranged to damp motion of the door as the door is opened by rotating the door away from the airframe; and
   a coupling mechanism which is arranged to couple the damper with the door over an opening damping range and decouple the damper from the door at an end of the opening damping range so that the damper does not damp the motion of the door as it opens further beyond the opening damping range;
   wherein the coupling mechanism comprises a fitting carried on the door and a coupling member pivotally attached to the damper; and
   wherein the coupling member is arranged to engage the fitting over the opening damping range and disengage from the fitting when the door opens beyond the opening damping range.

2. The installation of claim 1 wherein the door comprises a panel with an outer face on an exterior of the aircraft and an inner face carrying the fitting which extends from the inner face into the airframe when the door is closed.

3. The installation of claim 1 wherein the coupling member is pivotally attached to the airframe; and wherein the damper has a first end pivotally attached to the coupling member and a second end pivotally attached to the airframe, and the door is arranged to apply a force to the coupling member which causes the coupling member to rotate on its pivot, rotation of the coupling member causing the damper to change in length and damp the motion of the door.

4. The installation of claim 1 wherein the damper is arranged to move from a first position to a second position as the damper damps the motion of the door, and wherein the installation further comprises a return mechanism arranged to return the damper back to its first position after the door and damper have been decoupled.

5. An aircraft comprising an airframe; a landing gear mounted to the airframe in a landing gear bay; and a door installation according to claim 1 arranged to close the landing gear bay.

6. A method of operating an exterior door mounted to an airframe of an aircraft, the method comprising:
   a. opening the door, during flight of the aircraft, into airflow outside the aircraft by rotating the door away from the airframe from a closed angle to an open angle;
   b. damping motion of the door with a coupling mechanism arranged to couple a damper with the door as the door rotates away from the airframe over an opening damping range, the coupling mechanism comprising a fitting carried on the door, and a coupling member pivotally attached to the damper and arranged to couple the damper with the door by engaging the fitting over the opening damping range;
   c. decoupling the damper from the door when the door reaches an end of the opening damping range so that the damper stops damping the motion of the door, wherein the coupling member is arranged to decouple the damper from the door by disengaging from the fitting when the door opens beyond the opening damping range; and
   d. continuing to rotate the door away from the airframe over a non-damped opening range to the open angle, wherein the damper does not damp the motion of the door as it rotates over the non-damped opening range.

7. The method of claim 6 further comprising: closing the door from the open angle by rotating the door towards the airframe over a non-damped closing range, wherein the damper does not damp the motion of the door as the door rotates over the non-damped closing range; coupling the damper with the door at an end of the non-damped closing range so that the damper starts damping the motion of the door; and continuing to close the door by rotating the door towards the airframe over a damped closing range, wherein the damper damps the motion of the door as the door rotates over the damped closing range.

8. The method of claim 7 further comprising: decoupling the damper from the door at the end of the damped closing range so that the damper stops damping the motion of the door; and continuing to close the door to its closed angle by rotating the door towards the airframe over a final non-damped closing range, wherein the damper does not damp the motion of the door as the door rotates over the final non-damped closing range.

9. The method of claim 6 wherein the door comprises a panel with an outer face on an exterior of the aircraft and an inner face carrying the fitting which extends from the inner face into the airframe when the door is at its closed angle.

10. The method of claim 6 wherein the damper has a first end pivotally attached to the coupling member and a second end pivotally attached to the airframe; wherein the coupling member is pivotally attached to the airframe; and wherein the door applies a force to the coupling member which causes the coupling member to rotate on its pivot, rotation of the coupling member causing the damper to change in length and damp the motion of the door.

11. The method of claim 6 wherein the motion of the door during damping causes the damper to move from a first position to a second position; and the method further comprises returning the damper back to its first position after the door and damper have been decoupled.

12. The method of claim 6 further comprising: opening the door from its closed angle by rotating the door away from the airframe over an initial non-damped opening range up to a start of the damped opening range, wherein the damper does not damp the motion of the door as the door rotates over the initial non-damped opening range; and coupling the damper with the door at the start of the damped opening range so that the damper starts damping the motion of the door.

\* \* \* \* \*